US012567528B2

(12) United States Patent
Nakao et al.

(10) Patent No.: US 12,567,528 B2
(45) Date of Patent: Mar. 3, 2026

(54) CONTACTLESS POWER FEED APPARATUS AND POWER TRANSMISSION COIL

(71) Applicant: OMRON Corporation, Kyoto (JP)

(72) Inventors: Goro Nakao, Kyoto (JP); Yuki Ito, Kyoto (JP); Taichi Mishima, Kyoto (JP); Yusuke Kawai, Kyoto (JP); Hiroyuki Ibuki, Kyoto (JP); Yoshihisa Ishikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 40 days.

(21) Appl. No.: 18/463,263

(22) Filed: Sep. 7, 2023

(65) Prior Publication Data

US 2024/0136102 A1 Apr. 25, 2024
US 2024/0234003 A9 Jul. 11, 2024

(30) Foreign Application Priority Data

Oct. 21, 2022 (JP) ................................. 2022-169164

(51) Int. Cl.
*H01F 27/00* (2006.01)
*H01F 27/28* (2006.01)
*H01F 38/14* (2006.01)
*H02J 50/12* (2016.01)

(52) U.S. Cl.
CPC ....... *H01F 27/006* (2013.01); *H01F 27/2804* (2013.01); *H01F 38/14* (2013.01); *H02J 50/12* (2016.02)

(58) Field of Classification Search
CPC .......... H02J 50/12; H01Q 1/00; H01F 27/006; H01F 27/2804; H01F 38/14
See application file for complete search history.

(56) References Cited

U.S. PATENT DOCUMENTS

| | | | | |
|---|---|---|---|---|
| 2010/0148723 A1* | 6/2010 | Cook | ............... | G06K 19/07749 |
| | | | | 320/108 |
| 2011/0193421 A1* | 8/2011 | Urano | ..................... | H02J 50/12 |
| | | | | 307/104 |
| 2013/0181875 A1* | 7/2013 | Charrat | .................... | H04B 5/43 |
| | | | | 343/748 |
| 2013/0307346 A1* | 11/2013 | Arisawa | .............. | H02J 7/00302 |
| | | | | 307/104 |

(Continued)

FOREIGN PATENT DOCUMENTS

| | | |
|---|---|---|
| CN | 107146700 | 9/2017 |
| CN | 111245108 | 6/2020 |

(Continued)

OTHER PUBLICATIONS

"Office Action of Taiwan Counterpart Application", issued on Aug. 7, 2024, with English translation thereof, pp. 1-9.

*Primary Examiner* — Rexford N Barnie
*Assistant Examiner* — Joseph N Inge
(74) *Attorney, Agent, or Firm* — JCIPRNET

(57) ABSTRACT

A winding of a transmission coil included in a power transmission device of a contactless power feed apparatus and serving to transmit AC power to a power reception device contactlessly is formed of a wiring pattern provided on a substrate. The transmission coil is divided into partial coils arranged coaxially. Each of the partial coils is formed such that, among the partial coils, a number of turns of a winding included in a partial coil is larger as the partial coil is located more outwardly.

5 Claims, 3 Drawing Sheets

(56)                    References Cited

U.S. PATENT DOCUMENTS

| | | | | |
|---|---|---|---|---|
| 2014/0008974 A1* | 1/2014 | Miyamoto | ........... | H02J 50/402 |
| | | | | 307/104 |
| 2014/0197694 A1* | 7/2014 | Asanuma | ............. | H02J 50/005 |
| | | | | 307/104 |
| 2015/0084427 A1* | 3/2015 | Moon | .................. | H02J 50/402 |
| | | | | 307/104 |
| 2015/0170830 A1* | 6/2015 | Miyamoto | ............. | H02J 50/12 |
| | | | | 307/104 |
| 2015/0303708 A1* | 10/2015 | Efe | ....................... | H02J 50/005 |
| | | | | 307/104 |
| 2017/0012475 A1* | 1/2017 | Zhang | .................... | H02J 50/12 |
| 2019/0173325 A1* | 6/2019 | Ichikawa | .................. | H02J 7/00 |
| 2019/0334391 A1* | 10/2019 | Qi | ........................... | H01F 38/14 |
| 2019/0386388 A1* | 12/2019 | Yamamoto | ............. | H02J 50/12 |
| 2020/0006949 A1* | 1/2020 | Song | ....................... | H02J 50/70 |
| 2020/0366130 A1* | 11/2020 | Cho | .................. | H01M 10/4257 |
| 2021/0151250 A1 | 5/2021 | Zhu et al. | | |
| 2022/0352757 A1* | 11/2022 | Shin | ........................ | H01Q 7/00 |

FOREIGN PATENT DOCUMENTS

| | | |
|---|---|---|
| CN | 111816425 | 10/2020 |
| CN | 112259349 | 4/2022 |
| JP | 2013089728 | 5/2013 |
| TW | 201021354 | 6/2010 |
| TW | 202040914 | 11/2020 |

* cited by examiner

CONTACTLESS POWER FEED APPARATUS AND POWER TRANSMISSION COIL

CROSS-REFERENCE TO RELATED APPLICATION

This application claims the priority benefit of Japan application serial no. 2022-169164, filed on Oct. 21, 2022. The entirety of the above-mentioned patent application is hereby incorporated by reference herein and made a part of this specification.

BACKGROUND

Technical Field

The disclosure relates to a contactless power feed apparatus and a power transmission coil used in the contactless power feed apparatus.

Related Art

Conventionally, the so-called contactless power feed (also referred to as wireless power feed) technologies for transmitting power through space without passing through a metal contact have been under research.

As one of such contactless power feed technologies, a method is known in which power is transmitted from a primary side (power transmission side or power supply side) to a secondary side (power reception side) by magnetic field resonance between a coil on the primary side and a coil on the secondary side. In this method of power transmission by magnetic field resonance, a technique has been proposed to be capable of efficiently supplying power to a secondary coil on the power reception side regardless of where an electrical device is placed on a mounting surface, without increasing the number of primary coils on the power transmission side (for example, refer to Patent Document 1: Japanese Patent Application Laid-Open No. 2013-89728). In this technique, the primary coil fixedly provided between a magnetic body and a cover is formed as a coil having a coil cross section in a square shape similar to those of the magnetic body and the cover. The primary coil having a coil cross section in a square shape is wound from the magnetic body toward the cover on the upper side, and its coil central axis is biased to the horizontal direction as it extends toward the upper side. The bias direction is such that the coil central axis of the primary coil is biased to a diagonal direction of the coil cross section.

In the above technique, since the primary coil is wound from the magnetic body toward the cover on the upper side, a thickness in the normal direction of the surface of the magnetic body is present in the primary coil. Thus, in a power transmission-side device, to arrange the primary coil, it is required to secure a space corresponding to this thickness. However, depending on the application, it may be difficult to secure such a space. Further, in the above technique, the configuration of the primary coil becomes complicated, and as a result, the cost of the contactless power feed apparatus increases.

SUMMARY

An embodiment of the disclosure provides a contactless power feed apparatus including: a power transmission device; and a power reception device to which power is transmitted contactlessly from the power transmission device. In the contactless power feed apparatus, the power transmission device includes: a transmission coil that transmits AC power to the power reception device contactlessly; and a power supply circuit that supplies AC power to the transmission coil. The power reception device includes a resonant circuit including a reception coil that receives AC power from the transmission coil. A winding of the transmission coil is formed of a wiring pattern provided on a substrate, and the transmission coil is divided into a plurality of partial coils arranged coaxially, each of the plurality of partial coils being formed such that, among the plurality of partial coils, a number of turns of a winding included in a partial coil is larger as the partial coil is located more outwardly. With such a configuration, the contactless power feed apparatus can suppress variation in power transmission efficiency occurring due to a change in the positional relationship between the coil on the power transmission side and the coil on the power reception side while suppressing the thickness of the coil on the power transmission side.

In the contactless power feed apparatus, a number of turns of a winding included in each of the plurality of partial coils may increase by a predetermined number from a number of turns of a winding included in a partial coil located next inwardly. Accordingly, variation in the intensity of the magnetic flux occurring due to the position is more appropriately suppressed within the outer circumference of the transmission coil.

Further, in the contactless power feed apparatus, the plurality of partial coils may be formed such that a ratio of a second area surrounded by a second partial coil among the plurality of partial coils to a first area surrounded by a first partial coil among the plurality of partial coils is equal to a ratio of a second number of turns of a winding included in the second partial coil to a first number of turns of a winding included in the first partial coil. Accordingly, variation in the intensity of the magnetic flux occurring due to the position is more appropriately suppressed within the outer circumference of the transmission coil.

Another embodiment of the disclosure provides a contactless power feed apparatus including: a power transmission device; and a power reception device to which power is transmitted contactlessly from the power transmission device. In the contactless power feed apparatus, the power transmission device includes: a transmission coil that transmits AC power to the power reception device contactlessly; and a power supply circuit that supplies AC power to the transmission coil. The power reception device includes a resonant circuit including a reception coil that receives AC power from the transmission coil. A winding of the reception coil is formed of a wiring pattern provided on a substrate, and the reception coil is divided into a plurality of partial coils arranged coaxially, each of the plurality of partial coils being formed such that, among the plurality of partial coils, a number of turns of a winding included in a partial coil is larger as the partial coil is located more outwardly. With such a configuration, the contactless power feed apparatus can suppress variation in power transmission efficiency occurring due to a change in the positional relationship between the coil on the power transmission side and the coil on the power reception side while suppressing the thickness of the coil on the power reception side.

Still another embodiment of the disclosure provides a power transmission coil used for contactless power transmission. The power transmission coil includes a plurality of partial coils arranged coaxially on a substrate. A winding of each of the plurality of partial coils is formed of a wiring pattern provided on the substrate, and each of the plurality of partial coils is formed such that, among the plurality of partial coils, a number of turns of a winding included in a partial coil is larger as the partial coil is located more outwardly. With such a configuration, the power transmission coil can suppress variation in power transmission efficiency occurring due to a change in the positional relationship between a power transmission-side device using the power transmission coil and a power reception-side device while suppressing the thickness.

DESCRIPTION OF THE EMBODIMENTS

Embodiments of the disclosure provide a contactless power feed apparatus capable of suppressing variation in power transmission efficiency occurring due to a change in the positional relationship between a coil on a power transmission side and a coil on a power reception side while suppressing a thickness of the coil on the power transmission side.

Hereinafter, a contactless power feed apparatus according to an embodiment of the disclosure will be described with reference to the drawings. In the contactless power feed apparatus according to the disclosure, a coil for power transmission (hereinafter referred to as a transmission coil) included in a power transmission-side device (hereinafter simply referred to as a power transmission device) is formed of a wiring pattern provided on a substrate. Further, the transmission coil is divided into a plurality of partial coils that are formed coaxially. The transmission coil is formed such that the number of turns of the winding formed of the wiring pattern is larger as the partial coil among the plurality of partial coils is located more outwardly, that is, as the area of a region surrounded by the partial coil is larger. Accordingly, variation, which occurs due to the position, in the intensity of the magnetic flux generated by the transmission coil becomes small on the inner side of the transmission coil. Thus, within the transmission coil, the amount of flux linkage emitted from the transmission coil and passing through inside of a coil for power reception (hereinafter referred to as a reception coil) included in a power reception-side device (hereinafter referred to as a power reception device) is suppressed from changing due to the position of the reception coil. As a result, the contactless power feed apparatus can suppress variation in power transmission efficiency occurring due to a change in the positional relationship between the power transmission device and the power reception device.

Figure 1:
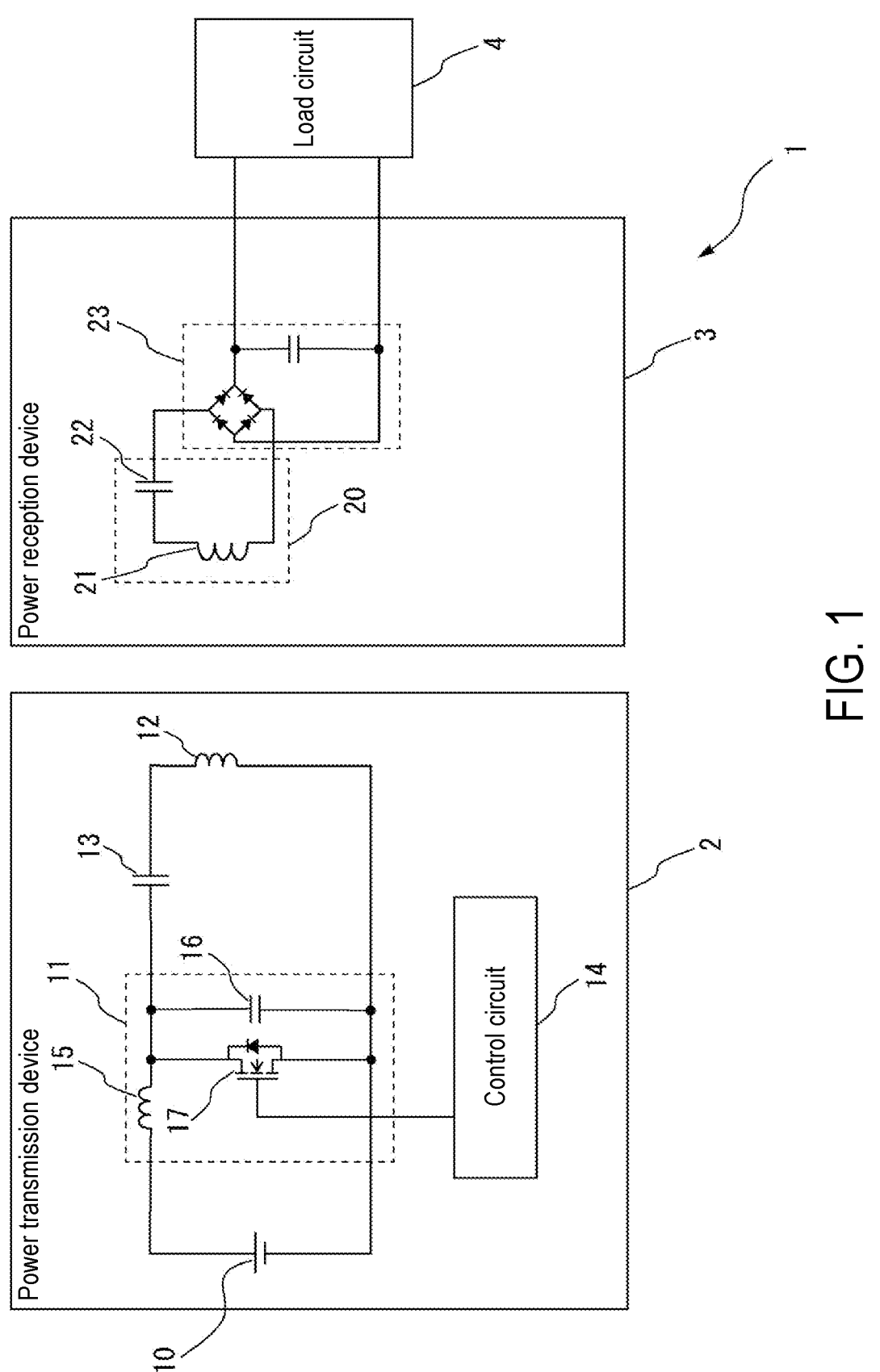
FIG. 1 is a schematic configuration view of a contactless power feed apparatus according to an embodiment of the disclosure.

FIG. 1 is a schematic configuration view of a contactless power feed apparatus according to an embodiment of the disclosure. As shown in FIG. 1, a contactless power feed apparatus 1 includes a power transmission device 2, and a power reception device 3 to which power is transmitted contactlessly via space from the power transmission device 2. The power transmission device 2 includes a power supply circuit 11, a transmission coil 12, a capacitor 13, and a control circuit 14. The power reception device 3 includes a resonant circuit 20 including a reception coil 21 and a resonant capacitor 22, and a rectifying and smoothing circuit 23. In addition, the power reception device 3 is connected with a load circuit 4. The load circuit 4 is, for example, a secondary battery, a charging circuit of a secondary battery, or a circuit operating using DC power.

Firstly, the power transmission device 2 will be described. The power supply circuit 11 converts a DC power supplied from a DC power source 10 into an AC power, and supplies the converted AC power to the transmission coil 12. Thus, the power supply circuit 11 includes a coil 15, a capacitor 16, and a switching element 17 and is configured as a DC-AC converter.

The coil 15 is connected between a terminal on the positive electrode side of the DC power source 10 and an end of the transmission coil 12. In addition, an end of the capacitor 16 is connected between the coil 15 and an end of the transmission coil 12, and the other end of the capacitor 16 is connected with a terminal on the negative electrode side of the DC power source 10. In addition, the coil 15 and the capacitor 16 convert the DC power outputted from the DC power source 10 into an AC power having a switching frequency at which the switching element 17 is switched ON and OFF.

The switching element 17 is connected between the capacitor 16 and the coil 15 to be parallel with the capacitor 16. That is, an end of the switching element 17 is connected with the terminal on the positive electrode side of the DC power source 10 via the coil 15, and the other end of the switching element 17 is connected with the terminal on the negative electrode side of the DC power source 10.

In addition, the switching element 17 is an element capable of switching ON and OFF by a switching frequency included in an ISM band. For example, the switching element 17 may be a field effect transistor formed of gallium nitride (GaN FET). A switching terminal (e.g., gate terminal of the GaN FET) of the switching element 17 is connected with the control circuit 14, and is switched ON and OFF in accordance with a control signal from the control circuit 14. As described above, with the switching element 17 being switched ON and OFF by the switching frequency, the DC power outputted from the DC power source 10 is converted into an AC power having the switching frequency by the coil 15 and the capacitor 16. The converted AC power is then outputted to the transmission coil 12.

The power supply circuit 11 may include a DC-DC converter for stepping up or down the DC power outputted from the DC power source 10 between the DC power source 10 and the coil 15.

According to a modification example, the power supply circuit 11 may be configured as a full bridge inverter in which four switching elements are connected in a full bridge configuration, or as a half bridge inverter in which two switching elements are connected in a half bridge configuration. In that case as well, with the control circuit 14 controlling ON and OFF of each switching element, the power supply circuit 11 converts a DC power supplied from the DC power source 10 into an AC power and supplies the converted AC power to the transmission coil 12. In that case, the switching frequency may be a frequency lower than the ISM band.

The transmission coil 12 is an example of a power transmission coil, and generates a magnetic field that changes periodically around the transmission coil 12 according to the AC power supplied from the power supply circuit 11. During power transmission, the transmission coil 12 and the reception coil 21 of the power reception device 3 are electromagnetically coupled by the magnetic field generated by the transmission coil 12. Accordingly, the AC power supplied to the transmission coil 12 is transmitted to the power reception device 3.

The capacitor 13 is connected in series with the transmission coil 12 between an output terminal on the positive electrode side of the power supply circuit 11 and an end of the transmission coil 12. In addition, the AC power outputted from the power supply circuit 11 is supplied to the transmission coil 12 via the capacitor 13. The capacitor 13 may be configured to resonate at the switching frequency of the applied AC power together with the transmission coil 12, or may be configured not to resonate at the switching frequency.

The control circuit 14 includes a processor, a memory, and a gate driver. In addition, the control circuit 14 switches ON and OFF of the switching element 17 of the power supply circuit 11 via the gate driver by a predetermined switching frequency (e.g., 6.78 MHz or 13.56 MHz) and a predetermined duty ratio (e.g., 0.5).

Next, the power reception device 3 will be described.

The resonant circuit 20 is an LC resonant circuit in which the reception coil 21 and the resonant capacitor 22 are connected in series. In addition, an end of the reception coil 21 included in the resonant circuit 20 is connected with one input terminal of the rectifying and smoothing circuit 23 via the resonant capacitor 22. In addition, the other end of the reception coil 21 is connected with the other input terminal of the rectifying and smoothing circuit 23. However, the resonant circuit 20 is not limited to this example, and may also be an LC parallel resonant circuit in which the reception coil 21 and the resonant capacitor 22 are connected in parallel.

By resonating with respect to the AC current flowing through the transmission coil 12 together with the resonant capacitor 22, the reception coil 21 receives power from the power transmission device 2. In addition, the reception coil 21 outputs the received power to the rectifying and smoothing circuit 23 via the resonant capacitor 22. That is, the inductance of the reception coil 21 and the capacitance of the resonant capacitor 22 are set such that the resonant frequency of the resonant circuit 20 is substantially equal to the switching frequency. In this embodiment, the outer diameter of the reception coil 21 may be smaller than the outer diameter of the transmission coil 12. Accordingly, it becomes possible to arrange the entire reception coil 21 more inwardly than the outer circumference of the transmission coil 12. Further, in this embodiment, due to the structure of the transmission coil 12 to be described later, the intensity distribution of the magnetic flux within the outer circumference of the transmission coil 12 is smoothed on a plane orthogonal to the axial direction of the transmission coil 12. Thus, it becomes easy to suppress variation, which occurs due to the relative positional relationship between the transmission coil 12 and the reception coil 21, in the flux linkage generated by the transmission coil 12 and passing through the reception coil 21.

The resonant capacitor 22 is connected in series with the reception coil 21. That is, an end of the resonant capacitor 22 is connected with an end of the reception coil 21, and the other end of the resonant capacitor 22 is connected with the rectifying and smoothing circuit 23. In addition, the resonant capacitor 22 outputs the AC power received by resonating together with the reception coil 21 to the rectifying and smoothing circuit 23.

The rectifying and smoothing circuit 23, for example, is composed of a full-wave rectifying circuit having four bridge-connected diodes and a smoothing capacitor. One of two terminals on the input side of the full-wave rectifying circuit is connected with the resonant capacitor 22, and the other of the two terminals on the input side is connected with the reception coil 21. In addition, one of two terminals on the output side of the full-wave rectifying circuit is connected with one end of the smoothing capacitor, and the other of the two terminals on the output side is connected with the other end of the smoothing capacitor. In addition, the rectifying and smoothing circuit 23 rectifies and converts the AC power outputted from the resonant circuit into a DC power. The rectifying and smoothing circuit 23 outputs the converted DC power to the load circuit 4. In place of a full-wave rectifying circuit, the rectifying and smoothing circuit 23 may also include a half-wave rectifying circuit.

In addition, the power reception device 3 may further include a DC-DC converter for stepping up or down the voltage of the DC power outputted from the rectifying and smoothing circuit 23.

Hereinafter, the configuration of the transmission coil 12 of the power transmission device 2 will be described.

Figure 2:
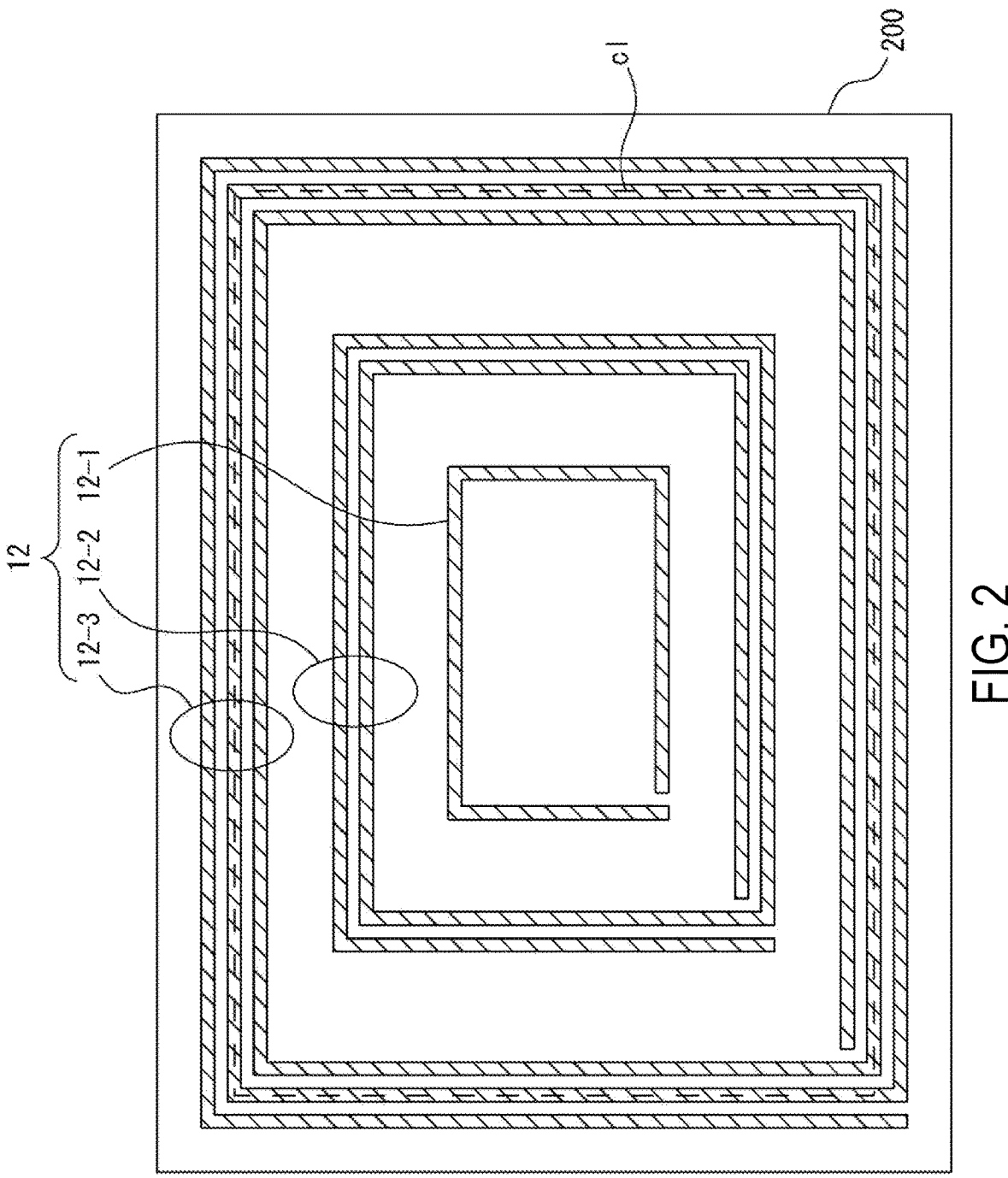
FIG. 2 is a schematic front view of a transmission coil, showing an example of the arrangement of the transmission coil according to this embodiment.

FIG. 2 is a schematic front view of the transmission coil 12, showing an example of the arrangement of the transmission coil 12 according to this embodiment. In this embodiment, on one surface of a substrate 200, the winding included in the transmission coil 12 is formed of a wiring pattern which is a conductor. The transmission coil 12 is divided into a plurality of partial coils 12-1 to 12-m (where m is an integer of 2 or more) that are arranged coaxially and connected to each other. In FIG. 2, illustrations of the wiring connecting between each partial coil and the circuit elements of the power transmission device 2 other than the transmission coil 12 are omitted. In the example shown in FIG. 2, the transmission coil 12 is divided into three partial coils 12-1 to 12-3 in a sequence from the inner side to the outer side. Each partial coil is formed in a rectangular shape. However, the shape of each partial coil is not limited to a rectangular shape, and may also be formed in a circular shape or an elliptical shape. Each partial coil is formed such that, among the plurality of partial coils, the number of turns of the winding included in a partial coil is larger as the partial coil is located more outwardly, that is, as the area of a region surrounded by the partial coil is larger.

With the transmission coil 12 formed in this manner, variation, which occurs due to the position, in the intensity of the magnetic flux generated by the transmission coil 12 is suppressed on the inner side of the transmission coil 12, that is, on the inner side of the outermost partial coil. As a result, as long as the reception coil 21 is arranged within the outer circumference of the transmission coil 12, a change in the flux linkage emitted from the transmission coil 12 and passing through inside of the reception coil 21 is suppressed regardless of the position of the reception coil 21. In particular, by increasing the number of turns for a partial coil located on the outer side, the magnetic flux generated by a partial coil becomes stronger as the partial coil is located more outwardly. Thus, the magnetic flux generated by the partial coil is suppressed from being canceled out by a reverse magnetic flux generated by other partial coils arranged on the inner side.

Further, the number of turns of each partial coil may increase by a predetermined number from an inner partial coil to an outer partial coil. Accordingly, variation in the intensity of the magnetic flux occurring due to the position is appropriately suppressed within the outer circumference of the transmission coil 12. The predetermined number is, for example, any integer of 1 to 10. However, if the total number of turns of the transmission coil 12 becomes too large, the inductance of the transmission coil 12 would become too large. Thus, on the power transmission side, in the case where the resonance of the transmission coil 12 together with the capacitor 13 with respect to the applied AC power is used for power transmission, the capacitance of the capacitor 13 would become excessively small. Furthermore, the parasitic capacitance generated between the pattern forming the transmission coil 12 would become too large. As a result, there may be cases where the transmission coil 12 becomes unable to resonate with respect to the AC power supplied to the transmission coil 12. Thus, the predetermined number is preferable 2 or less, and more preferably 1, for example. Furthermore, the number m of the partial coils is preferably 5 or less, and more preferably 3 or less, for example. In the example shown in FIG. 2, the predetermined number is 1 and the number m of the partial coils is 3. That is, a number $n1$ of turns of the innermost partial coil 12-1 is 1, a number $n2$ of turns of the second innermost partial coil 12-2 is 2, and a number $n3$ of turns of the outermost partial coil 12-3 is 3.

Furthermore, each partial coil may be configured such that the ratio of a second area surrounded by a second partial coil among the plurality of partial coils to a first area surrounded by a first partial coil among the plurality of partial coils is equal to the ratio of a second number of turns of the winding included in the second partial coil to a first number of turns of the winding included in the first partial coil. Accordingly, variation in the intensity of the magnetic flux occurring due to the position is appropriately suppressed within the outer circumference of the transmission coil 12. In the example shown in FIG. 2, the number $n1$ of turns of the innermost partial coil 12-1 is 1, and the number of turns $n3$ of the outermost partial coil 12-3 is 3. Thus, the partial coil 12-1 and the partial coil 12-3 are formed such that the ratio ($S1/S3$) of an area $S1$ (second area) of the partial coil 12-1 (an example of the second partial coil) to an area $S3$ (first area) of the partial coil 12-3 (an example of the first partial coil) is equal to ($n1/n3$). That is, the length of the outer circumference of the partial coil 12-1 is ($1/3$) ½ times the length of the outer circumference of the partial coil 12-3. Similarly, since the number $n2$ of turns of the central partial coil 12-2 (another example of the second partial coil) is 2, the partial coil 12-2 and the partial coil 12-3 are formed such that the ratio ($S2/S3$) of an area $S2$ of the partial coil 12-2 to the area $S3$ of the partial coil 12-3 is equal to ($n2/n3$). Thus, the length of the outer circumference of the partial coil 12-2 is ($2/3$) ½ times the length of the outer circumference of the partial coil 12-3. To suppress variation in the area of each partial coil due to the number of turns of the winding included in the partial coil, the width of the wiring pattern serving as the winding, and the insulating distance between the wiring pattern, the area surrounded by a center line (e.g., center line cl for the partial coil 12-3) in the width direction of one or more windings included in the partial coil may be defined as the area of the partial coil. Similarly, the length of the outer circumference of each partial coil may be represented by the total length of the center line in the width direction of one or more windings included in the partial coil.

Figure 3:
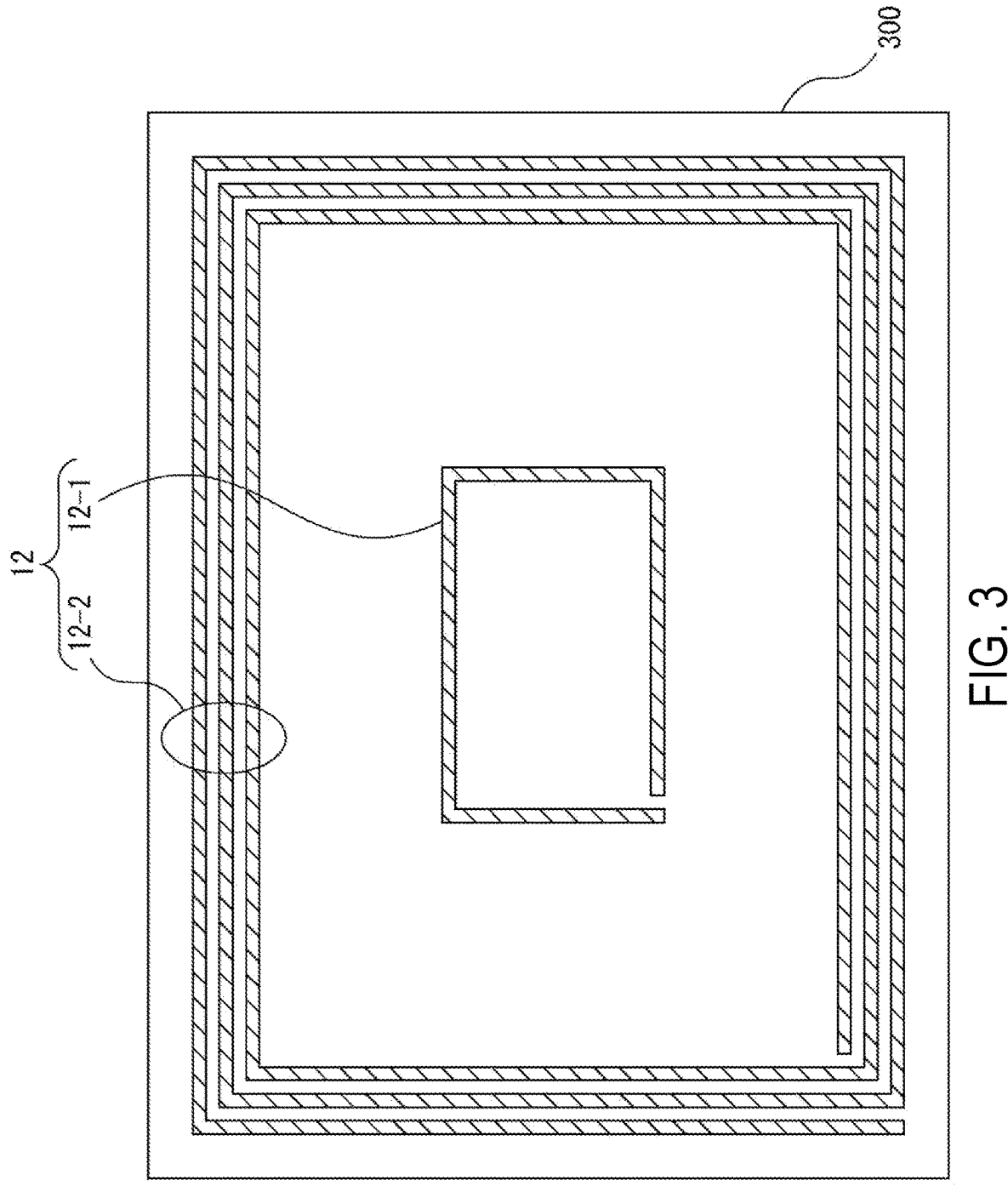
FIG. 3 is a schematic front view of the transmission coil, showing another example of the arrangement of the transmission coil according to this embodiment.

FIG. 3 is a schematic front view of the transmission coil 12, showing another example of the arrangement of the transmission coil 12 according to this embodiment. In this example, the transmission coil 12 is divided into two partial coils, i.e., a partial coil 12-1 and a partial coil 12-2, arranged coaxially in a sequence from the inner side. Each partial coil is configured as a pattern of a wiring, which is a conductor, on one surface of a substrate 300.

In this example, a number $n1$ of turns of the inner partial coil 12-1 is 1, and a number $n2$ of turns of the outer partial coil 12-2 is 3. In this example as well, the partial coil 12-1 and the partial coil 12-2 are formed such that the ratio ($S1/S2$) of an area $S1$ of the partial coil 12-1 to an area $S2$ of the partial coil 12-2 is equal to ($n1/n2$).

In this example as well, variation, which occurs due to the position, in the magnetic flux generated by the transmission coil 12 is suppressed on the inner side of the transmission coil 12. Thus, as long as the reception coil 21 is arranged within the outer circumference of the transmission coil 12, a change in the flux linkage emitted from the transmission coil 12 and passing through inside of the reception coil 21 is suppressed regardless of the position of the reception coil 21.

As described above, in the contactless power feed apparatus, the transmission coil is formed of a pattern of a wiring composed of a conductor provided on the substrate. Accordingly, the thickness of the transmission coil is suppressed. Further, the transmission coil is divided into a plurality of partial coils formed coaxially. The transmission coil is formed such that, among the plurality of partial coils, the number of turns of the winding formed of the wiring pattern is larger as the partial coil is located more outwardly. Accordingly, variation, which occurs due to the position, in the intensity of the magnetic flux generated by the transmission coil becomes small within the outer circumference of the transmission coil. Thus, the amount of flux linkage emitted from the transmission coil and passing through inside of the reception coil is suppressed from changing due to a change in the relative position of the reception coil with respect to the transmission coil. Accordingly, the contactless power feed apparatus can suppress variation in power transmission efficiency occurring due to a change in the positional relationship between the transmission coil and the reception coil while suppressing the thickness of the transmission coil.

According to a modification example, a surface of the substrate on which at least one partial coil among the plurality of partial coils of the transmission coil 12 is provided may be different from a surface of the substrate on which other partial coils are provided. For example, in the example shown in FIG. 2, the partial coil 12-1 and the partial coil 12-3 may be provided on one surface of the substrate 200, and the partial coil 12-2 may be provided on the other surface of the substrate 200. Alternatively, the partial coil 12-1 and the partial coil 12-2 may be provided on one surface of the substrate 200, and the partial coil 12-3 may be provided on the other surface of the substrate 200. In that case, two partial coils provided on different surfaces of the substrate may be connected via a via provided at the substrate. In this modification example as well, the contactless power feed apparatus can obtain the same effects as in the above embodiment.

According to another modification example, the reception coil 21 may be configured in the same manner as the transmission coil 12 in the above embodiment or modification example. That is, the reception coil 21 may be formed of a wiring pattern provided on the substrate. Furthermore, the reception coil 21 may be divided into a plurality of partial coils arranged coaxially, and may be configured such that the number of turns is larger as the partial coil is located more outwardly. Furthermore, each partial coil may be configured such that, for two partial coils among the plurality of partial coils, the ratio of areas surrounded by each of the two partial coils is equal to the ratio of numbers of turns of the two partial coils. In this case as well, the contactless power feed apparatus can obtain the same effects as in the above embodiment. In the case where the reception coil 21 is configured in the same manner as the transmission coil 12 according to the above embodiment, the outer diameter of the transmission coil 12 may be smaller than the outer diameter of the reception coil 21. Furthermore, it is possible that the transmission coil 12 is not divided into a plurality of partial coils.

Thus, those skilled in the art may make various changes according to the form implemented within the scope of the disclosure.

What is claimed is:

1. A contactless power feed apparatus comprising: a power transmission device; and a power reception device to which power is transmitted contactlessly from the power transmission device,
    the power transmission device comprising:
    a transmission coil that transmits AC power to the power reception device; and
    a power supply circuit that supplies AC power to the transmission coil,
    the power reception device comprising:
    a resonant circuit comprising a reception coil that receives AC power from the transmission coil, wherein
    a winding of the transmission coil is formed of a wiring pattern provided on a substrate, and the transmission coil is divided into a plurality of partial coils arranged coaxially, each of the plurality of partial coils being formed such that, among the plurality of partial coils, a number of turns of a winding included in a partial coil is larger as the partial coil is located more outwardly, wherein the plurality of partial coils comprises a first partial coil, a second partial coil and a third partial coil, the first partial coil and the second partial coil are provided on one side of the substrate, the third partial coil is provided on the other side of the substrate.

2. The contactless power feed apparatus according to claim 1, wherein a number of turns of a winding included in each of the plurality of partial coils increases by a predetermined number from a number of turns of a winding included in a partial coil located next inwardly.

3. The contactless power feed apparatus according to claim 1, wherein the plurality of partial coils are formed such that a ratio of a second area surrounded by the second partial coil among the plurality of partial coils to a first area surrounded by the first partial coil among the plurality of partial coils is equal to a ratio of a second number of turns of a winding included in the second partial coil to a first number of turns of a winding included in the first partial coil.

4. A contactless power feed apparatus comprising: a power transmission device; and a power reception device to which power is transmitted contactlessly from the power transmission device,
    the power transmission device comprising:
    a transmission coil that transmits AC power to the power reception device; and
    a power supply circuit that supplies AC power to the transmission coil,
    the power reception device comprising:
    a resonant circuit comprising a reception coil that receives AC power from the transmission coil, wherein
    a winding of the reception coil is formed of a wiring pattern provided on a substrate, and the reception coil is divided into a plurality of partial coils arranged coaxially, each of the plurality of partial coils being formed such that, among the plurality of partial coils, a number of turns of a winding included in a partial coil is larger as the partial coil is located more outwardly, wherein the plurality of partial coils comprises a first partial coil, a second partial coil and a third partial coil, the first partial coil and the second partial coil are provided on one side of the substrate, the third partial coil is provided on the other side of the substrate.

5. A power transmission coil used for contactless power transmission, comprising:
    a plurality of partial coils arranged coaxially on a substrate, wherein
    a winding of each of the plurality of partial coils is formed of a wiring pattern provided on the substrate, and each of the plurality of partial coils is formed such that, among the plurality of partial coils, a number of turns of a winding included in a partial coil is larger as the partial coil is located more outwardly, wherein the plurality of partial coils comprises a first partial coil, a second partial coil and a third partial coil, the first partial coil and the second partial coil are provided on one side of the substrate, the third partial coil is provided on the other side of the substrate.

* * * * *